United States Patent
Fletcher et al.

(10) Patent No.: US 6,791,452 B2
(45) Date of Patent: Sep. 14, 2004

(54) PLATFORM FOR ITEM SENSING AND IDENTIFICATION

(75) Inventors: Richard Fletcher, Cambridge, MA (US); Gershenfeld Neil, Somerville, MA (US); Paul Yarin, Cambridge, MA (US); Hiroshi Ishii, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 496 days.

(21) Appl. No.: 09/750,231

(22) Filed: Dec. 27, 2000

(65) Prior Publication Data

US 2001/0035815 A1 Nov. 1, 2001

Related U.S. Application Data

(60) Provisional application No. 60/173,605, filed on Dec. 29, 1999.

(51) Int. Cl.[7] .................................................. H04Q 5/22
(52) U.S. Cl. .................. 340/10.6; 340/10.1; 340/10.51; 340/505; 340/517; 340/524; 340/572.1
(58) Field of Search .......................... 340/10.6, 870.34, 340/573.1, 505, 10.51, 825.69, 517, 524, 10.1, 572.1; 335/13; 324/207

(56) References Cited

U.S. PATENT DOCUMENTS

| | | | | |
|---|---|---|---|---|
| 4,988,837 A | * | 1/1991 | Murakami et al. | 178/18.07 |
| 5,815,091 A | | 9/1998 | Dames et al. | 340/870.34 |
| 5,936,523 A | * | 8/1999 | West | 340/545.6 |
| 6,563,417 B1 | * | 5/2003 | Shaw | 340/10.1 |

* cited by examiner

*Primary Examiner*—Michael Horabik
*Assistant Examiner*—Vernal Brown
(74) *Attorney, Agent, or Firm*—Testa, Hurwitz & Thibeault, LLP

(57) ABSTRACT

The response of an object to a single time-varying magnetic field is sensed to determine object position and/or manipulation on a horizontal or vertical surface. A time-varying interrogation signal, which interacts with tags disposed on the surface, is read by an array of sensing coils. Control circuitry receives signals from the sensing coils representing this interaction and, based thereon, determines the identity, position, and manipulation of each of the objects based on the sensed signals and the known positions of the sensing coils. Feedback to the user can be provided in the form of a localized output (e.g. light, sound, heat, etc.) physically coincident with the object.

26 Claims, 4 Drawing Sheets

PLATFORM FOR ITEM SENSING AND IDENTIFICATION

RELATED APPLICATION

This application claims the benefits of U.S. Provisional Application Ser. No. 60/173,605 filed on Dec. 29, 1999.

FIELD OF THE INVENTION

The present invention relates to remote sensing and identification, and in particular to sensing based on inexpensive electromagnetically actuable "tags."

BACKGROUND OF THE INVENTION

Many human tasks involve the manipulation of items disposed on a surface, such as a desk, kitchen counter/stove, a liquor-bar countertop, white drawing board, retail display rack, game board, or assembly surface. The items themselves may simply be moved around on the surface, or may instead undergo some type of manipulation (such as rotation, bending, opening, stretching, or squeezing). Frequently it would be useful to track the positions and identity of the items, as well as monitor the physical manipulations they undergo. Sensing the object manipulations would, for example, allow the objects themselves (or portions of the objects) to be used as controllers for an external process or control of displayed information.

Unfortunately, current approaches to these tasks tend to be very expensive and/or limited in capability. For example, computer-vision techniques have been employed to identify objects and observe object manipulations, but these techniques involve elaborate equipment and specialized interpretive software for particular applications. Moreover, computer vision requires continuous line-of-sight visual access to the objects and is significantly affected by changes in lighting, placing limitations on system robustness and the allowable range of monitorable user-item interactions. Accordingly, such systems are frequently unsuitable for real-world applications.

DESCRIPTION OF THE INVENTION

Brief Summary of the Invention

The present invention monitors objects that have been equipped with "tags" that impart information by electromagnetic coupling. One well-known type of tag is the radio frequency identification (RFID) device, which has been employed for some time to remotely sense parameters of interest in people or objects. An RFID tag receives a wireless signal from an externally located "reader," which determines the identity (or other parameter of interest) of the item based on the response of the RFID device to the transmitted signal. Other types of tags do not contain electronic circuitry, instead relying on the unique electromagnetic response of certain material structures. Anti-theft tags utilized in department stores represent an example of this approach.

In accordance with the present invention, an object's response to a single time-varying magnetic field is sensed and analyzed to determine object position and/or manipulation on a work surface. This may be accomplished by means of coils disposed underneath the surface on which the objects reside. An array of sensing coils (e.g., in a linear sequence or two-dimensional matrix), and optionally larger excitation coil—which may surround the sensing coils—generates a time-varying interrogation signal. The interrogation signal interacts with electromagnetic (e.g., RFID or materials-based) tags disposed on the surface, and each sensing coil is capable of independently sensing electromagnetic signals from tagged objects in its vicinity. Control circuitry receives signals from the sensing coils representing this interaction. These signals represent the interrogation signal as affected by the tags themselves as well as by their proximities to the sensing coils. Alternatively, the same coils may be used for interrogation and sensing. In this case, the coils are sequentially energized, and the electromagnetic response of the tag identifies it.

The control circuitry is further configured to determine positions for each of the objects based on the sensed signals and the known positions of the sensing coils; object position may include not only the two-dimensional location of the object on the surface, but also a spatial component representing the height of the object thereabove.

Preferably, the system includes a display device that facilitates "coincident feedback" concerning an object-that is, object information is presented proximate to or "co-located" with the object itself, even as its position changes. For example, the surface upon which the objects are manipulated may contain a matrix of individually actuable display elements or pixels responsive to object identity and position, such that only those devices in proximity to objects are active at any time. For example, coincident illumination feedback may appear as a halo of light or graphical icon that follows the tagged object as it is moved around by the user (in the manner of an optical shadow). In addition to light patterns, other forms of coincident feedback are possible, for example, localized sound or heat generated by a suitable array of sound elements or heating elements. As used herein, the term "display" refers generally to all such forms of coincident feedback.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
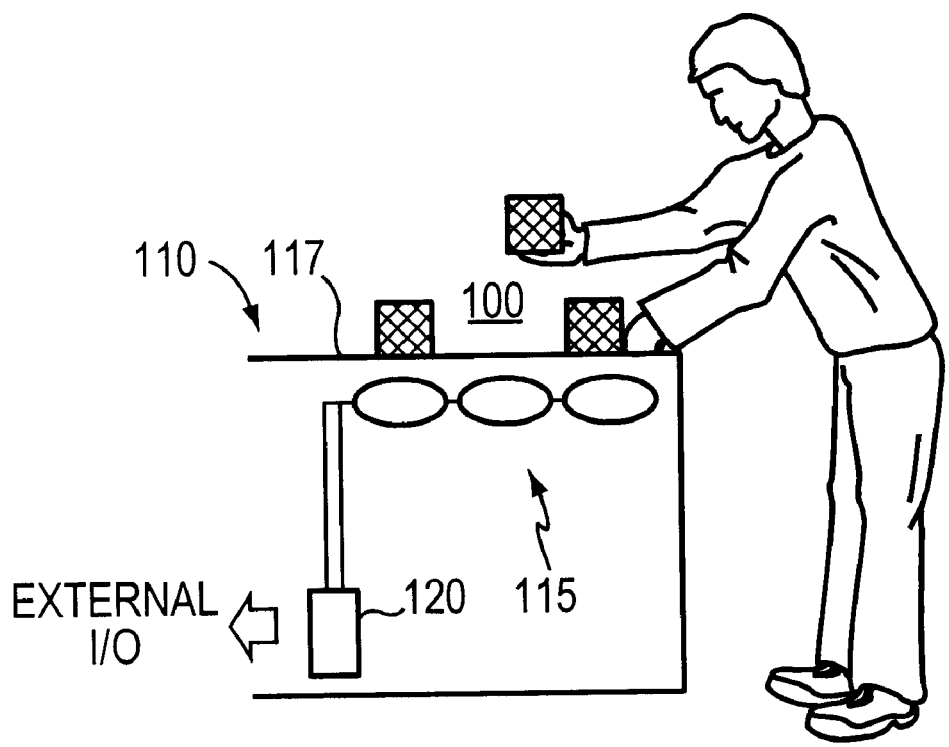
FIG. 1 schematically represents the basic approach of the invention.

With reference to FIG. 1, a system in accordance with the invention monitors the positions and/or physical characteristics (resulting from the environment or manipulation) of a series of objects representatively indicated at 100 and disposed on a surface 110. Underlying surface 110 (which may be horizontal, as shown, or vertical in orientation) is an array of sensing elements (e.g., coils 115), which produce an interrogation signal and sense the interaction of that signal with tags on surface 110. The coils 115 are connected to a reader 120, the components of which are described in greater detail below. Reader 120 may be connected to (or incorporate) external equipment, such as a computer or microcontroller, which may itself be coupled to other computers by way of a network. Consequently, it is possible to configure reader 120 for remote querying via, for example, the Internet.

Figure 2:
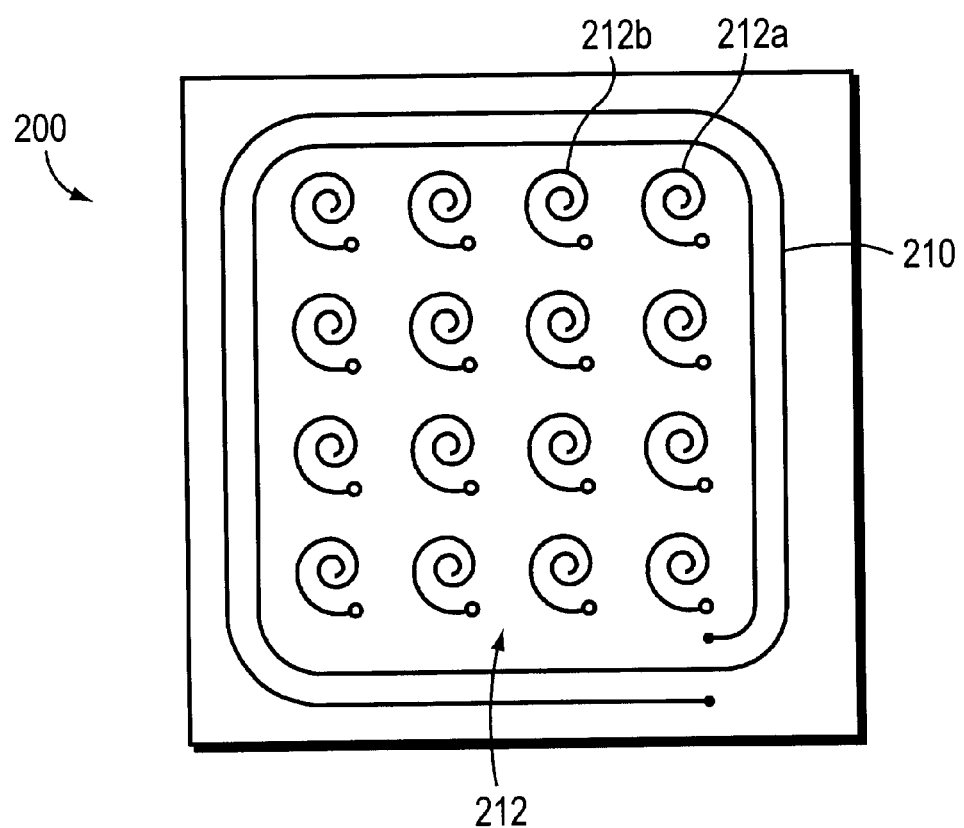
FIG. 2 schematically represents a representative sensing array.

FIG. 2 illustrates a representative sensing array 200 that includes utilizes separate interrogation and sensing coils. In particular, a planar excitation coil 210 surrounds a matrix array of planar sensing coils representatively indicated at 212a, 212b, all of which are defined by metal traces on a circuit board. The rendition of the coils in FIG. 2 is for illustrative purposes only. In fact, the various coils 212 would be spaced far more closely, and for maximum coverage would actually overlap. This may be accomplished by applying adjacent coils onto different boards that are subsequently stacked, so that the coils overlap at different levels but remain insulated from each other. Alternatively, the coils may be applied onto two sides of single board, with portions of some of the coils-i.e., portions that would otherwise overlap other coils-being applied to the reverse side of the board (with electrical continuity retained through vias).

Figure 3:
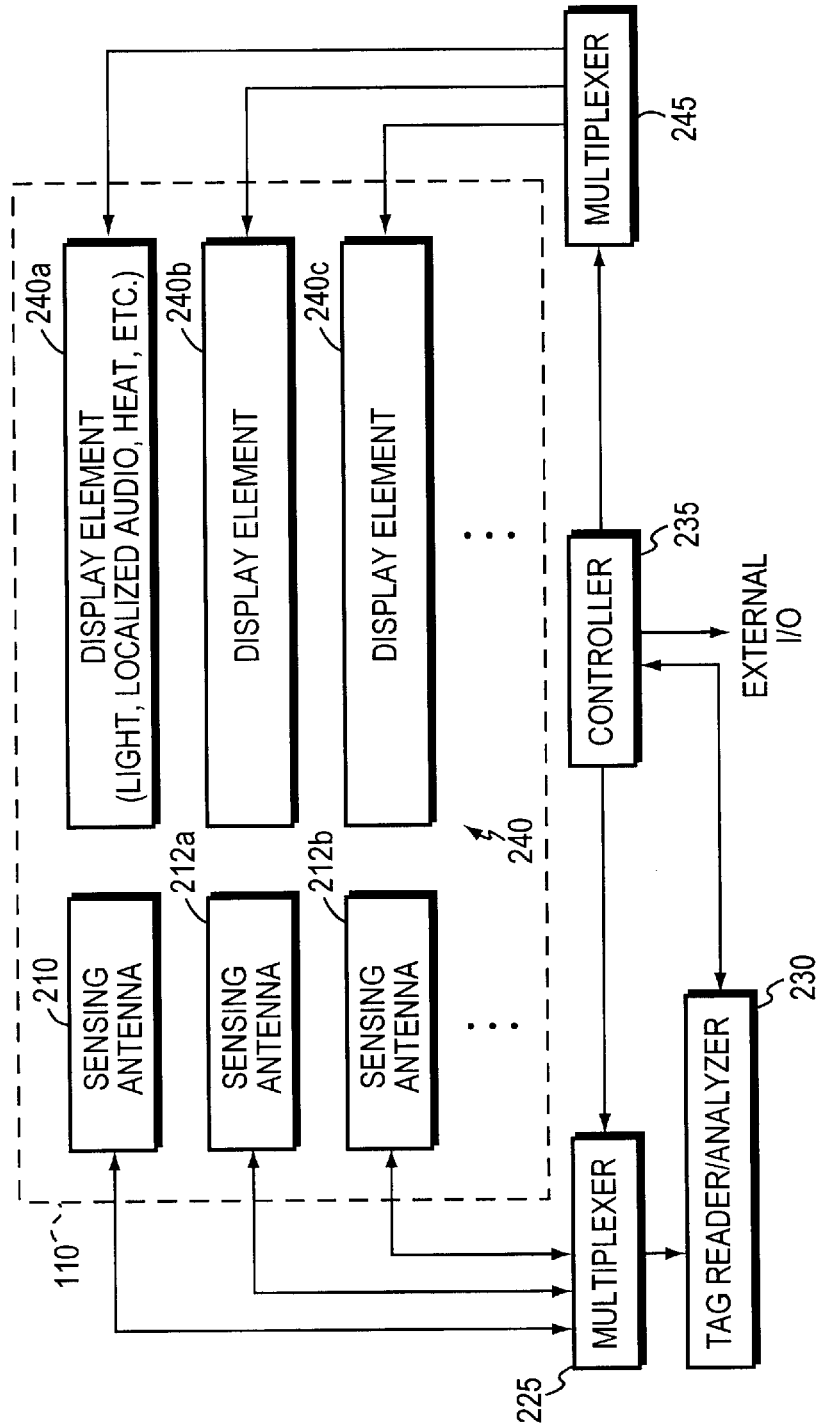
FIG. 3 schematically represents a sensing array, display element array and reader circuitry accordance with the invention.

FIG. 3 illustrates a system incorporating the sensing array 200. Coils (or other sensing antennas) 210, 212 underlie surface 110 and are connected, via a multiplexer 225, to a tag reader/analyzer 230, which determines the positions of sensed objects and/or properties associated therewith. The output of tag reader 230 is provided to a controller 235, which facilitates transfer of this information to an external device such as a computer, modem, web server, and/or a display 240 that includes series of display elements associated with surface 110 and representatively indicated at 240a, 240b, 240c. Typically the display elements 240 are arranged in a matrix distributed across the surface 110. In one especially preferred approach, feedback to the user is provided via a visual indication identifying the tagged object or some characteristic associated therewith, appearing in proximity to the object itself. For example, surface 110 (FIG. 1) may be equipped with a matrix of light-emitting diodes (LEDs) whose display is responsive to the output of controller 235 via a multiplexer 245. The object or a characteristic thereof may be identified by means of a light pattern, a particular displayed color, an alphanumeric readout, etc. activated at or near the object's location. This displayed information or pattern follows the object as it is moved by the user. As a result, a visual indication concerning the object is co-located with that object for ready association as a form of "digital shadow." As the object is moved, only that portion of the display 240 closest to the object is activated to show the identifier; the remainder of the display elements or pixels are either off or identify other objects.

In a representative implementation, coil 210 is connected to a transmit or excitation module within reader 230. This module may contain one or more fixed or variable frequency generators, depending on the implementation. For example, direct digital synthesis chips can be controlled very precisely to sub-Hertz resolution, and exhibit almost no frequency drift. Controller 235, which may direct the pattern of excitation and sensing, can be implemented as a microcomputer or, more typically, a microcontroller (e.g., the PIC16F877 microcontroller supplied by Microchip Technology Inc., Chandler, Ariz.) programmed to execute the functions herein described.

In the illustrated implementation, controller 235 causes reader 230 to continually transmit an rf signal to coil 210, resulting in an rf magnetic field affecting the region above and below the sensing coils. The objects, which are located in a sensing region within this area of coverage, are equipped with RFID chips or other variety of electromagnetic tags. These tags may be, for example, simple (i.e., non-chip) magnetoeleastic resonator strips that absorb magnetic energy at a characteristic frequency, with that frequency serving to identify the device. Alternatively, the device may modulate its response over time to convey a series of bits in the time domain. Typically, when the possibility of multiple proximate tags exists, it is preferable to have each of these operating at a different frequency in order to avoid interference, since the field from coil 210 will affect all devices within the sensing region simultaneously. The transmit module of reader 230 will then act, in effect, as a sweep generator, repeatedly varying the rf signal frequency through a band sufficient to cover the operating frequencies of all possible devices.

Some known RFID devices have "anticollision" features that prevent more than a single tag from modulating the rf signal at one time. If such devices are employed, reader 230 may operate at a single frequency to which all tags respond.

Multiplexer 225 cycles through the sensing coils 212, sequentially connecting each of them to reader 230 (so that reader 230 receives a signal from only one sensing coil at a time) in response to commands issued by controller 235. Multiplexer 225 (and 245) may be realized as an analog multiplexer or, alternatively, as a series of opto-isolators with zero-crossing TRIAC outputs (which facilitate switching of AC signals); in the latter case, each opto-isolator is connected to a different one of coils 212 and, once again, responds to commands from controller 235 that cause the sensing coils to be sequentially polled. The advantage to an opto-isolator circuit is reduction of rf interference.

Each time one of the coils 212 is connected to tag reader 230, its signal is sensed. If the transmit module sweeps over a series of frequencies, each sensing coil is polled for a sufficient duration to permit the entire frequency band to be swept. For example, detection of tag signals may be accomplished using a pair of synchronous demodulators for low frequencies (<300 Hz) or a quadrature mixer for high-frequency signals. Reader 230 may contain a database (or series of registers) in which data representing each sensed signal is recorded; that is, for each sensing coil, the identifier for each sensed tag, as well as the sensed signal magnitude and phase, is recorded. After all sensing coils have been polled, reader 230 analyzes the database to determine the position of each sensed tag. This may be accomplished, for example, by determining, for each sensing coil, the sensed signal magnitude at the center of the coil (or as an average across the coil area). The relative magnitudes of these values are assessed for all sensing coils that received the signal (i.e., the coils to which the tagged object was sufficiently proximate), and the two-dimensional position of the object determined by interpolation of the signals received by two or more sensing antenna elements.

Alternatively, sensing coil 210 may be eliminated, and the transmit module of reader 230 caused by controller 235 to sequentially energize coils 212 via multiplexer 225. In this case, reader 230 is configured to sense the field strength of its own signal, which is modulated by tags within the read range—either by reducing field strength at a characteristic frequency or by varying the reduction in field strength over time to convey a series of bits. Once again, reader 230 can energize each coil over a band of frequencies to facilitate sensing of tags operating at different frequencies. The strength of the signal interaction provides a measure of distance between the tag and the coil, so that multiple measurements associated with differently located coils can be correlated to specify object position with some precision.

Figure 4:
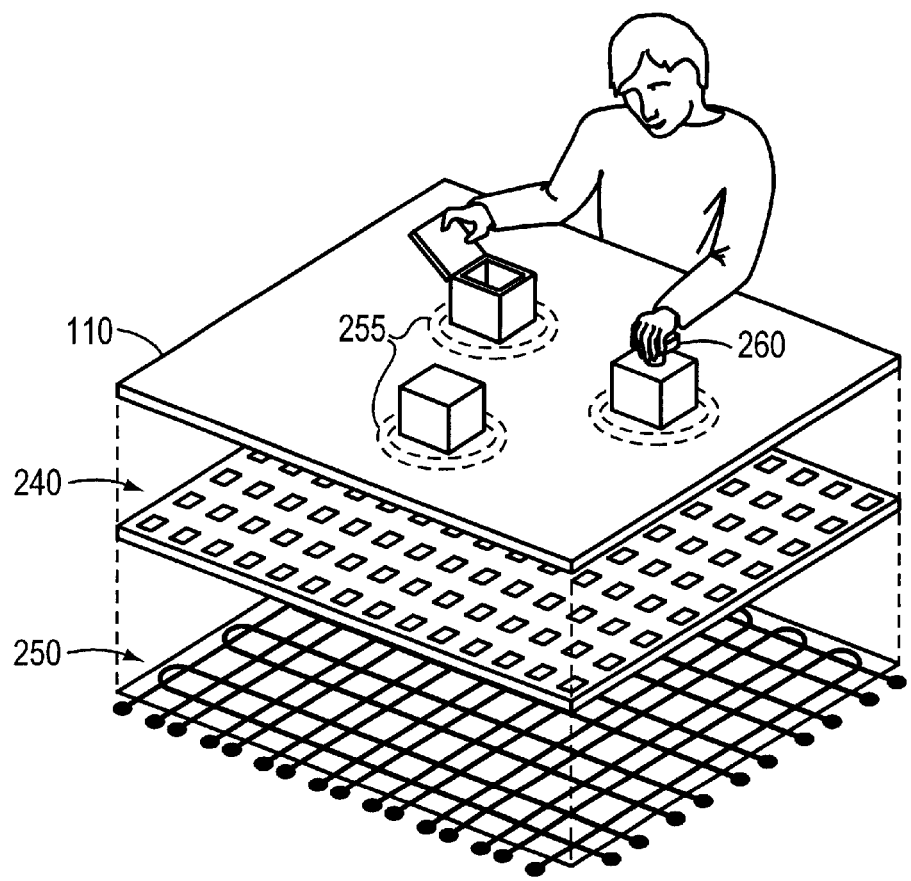
FIG. 4 is an exploded view of a system utlizing a two-dimensional sensing matrix.

In still another alternative, the sensing array 212 can be implemented in a row-column geometry as shown in FIG. 4. The illustrated system includes a transparent or translucent surface 110; an underlying display matrix 240 visible, when illuminated, through surface 110; and an antenna matrix 250 underlying the display matrix 240. Each row or column of antenna matrix 250 behaves as a coil, which can excite or sense depending on whether it is driven or read. Thus, a matrix 240 having N rows and M columns provides N×M different sensing zones. To locate objects on surface 110, each row and column antenna is driven separately. Each time a row or column antenna is driven, the other antennas act as sensing elements. The position of an object on surface 110 is localized by the row and column measurements that have detected that object; as a result, coincident displays 255 can "follow" the objects as they are moved on surface 110. (Because more than one object may be present along a given row or column, each object should have a distinguishable response.) Thus, using this approach, it is necessary to perform only N+M measurements to localize an object. The interconnections and, hence, the wiring between the multiplexer and the sensing array elements is thereby greatly reduced and simplified.

By establishing expected signal magnitude values for items located at various positions on the sensing surface, it is possible to compute an approximate height of the item above the sensing surface. That is, the expected signal magnitudes represent baseline levels for an item resting against the surface, and since the signal drops with the square of distance from the surface, deviations from the expected magnitudes translate directly into an approximate height. It is of course not necessary to store expected signal magnitudes for every possible position; instead, the expected signal magnitude may be derived mathematically according to an appropriate model, or alternatively, expected magnitudes for some positions may be stored and magnitudes for other positions estimated by interpolation. In essence, whereas a two-dimensional position may be obtained from differences in amplitude among the various coils, the sum of the amplitudes can be used to estimate height.

Continuous polling of the sensing coils and fixing of identified object positions facilitates tracking of objects as they move across the sensing surface. For example, the database of tag reader 230 may include entries identifying each sensed object and its latest computed position. Once again, this information can be displayed directly, or may simply be made available upon external query. It should also be stressed that information concerning a tagged object may be contained within the tag itself (and read out when the tag is interrogated), or may instead be contained within the interpreter database; for example, the tag may read out no more than a numerical identifier, which is related, in the database, to the identity or type of object so tagged.

The foregoing discussion focused on the use of electromagnetically activated tags to sense object position and identity. It is also possible to detect physical manipulations of an object and conditions associated therewith. For example, the present invention can be employed to determine when a bottle is opened or closed by observing the frequency harmonics generated by a tag containing a soft magnetic material (e.g., an FeNiCo alloy or Permalloy). A magnet fragment is placed in the bottle cap, and closure of the cap drives the magnetic material into saturation, suppressing the frequency harmonics produced by the nonlinear hysteresis loop of the soft magnetic alloy. Alternatively, an electromagnetic resonator in the form of a capacitor-inductor pair can be employed as the tag in the neck of the bottle, and a ferrite material in the bottle cap can be used to produce the coil inductance and thus a measurable frequency shift when the bottle cap is opened or closed. Other physical manipulations that may be similarly detected include squeezing, twisting, the application of pressure, pulling, etc.

Specific mechanical features such as buttons, dials, sliders or switches (as indicated at 260 in FIG. 4) can be designed into the object to function as explicit controls which the user can manipulate.

It is also possible to utilize electromagnetic structures within a tag that respond to a physical or environmental condition, such as the structures described in U.S. Pat. No. 6,025,725, the entire disclosure of which is hereby incorporated by reference. Those structures may be implemented as LC resonators incorporating a piezoelectric element, and in response to an external condition (such as applied force, temperature, humidity, and/or light), vary in terms of a measurable electrical characteristic such as resonant frequency, harmonic spectra, and/or Q factor. Thus, for example, by disposing such elements on surface 110, not only the location but also the weight of an object can be sensed, since this will result in a measurable force applied to the affected coil or coils. For example, using such elements, the location of the object may be determined by amplitude differences, while its weight may be determined by deviations from the elements' expected resonant frequencies. This effect may be segregated from conditions such as temperature and humidity that affect all elements equally, and which may themselves be of interest.

The present invention is amenable to a broad variety of applications. Hospitals or even homes, for example, might utilize a "smart surface" in order to identify or verify the identities of pharmaceuticals. Drug bottles could contain an electromagnetic tag in addition to a visual label, so that when a bottle is placed on surface 110, the tag prompts display of relevant information. Indeed, the system may be configured to establish an Internet connection to the manufacturer's website in order to obtain the very latest information. Placement of two drug bottles on surface 110 can prompt delivery of information concerning interactions between the two drugs.

In a retail context, surface 110 can be utilized as a flexible point-of-sale display, instantly presenting information about whatever products the merchant chooses to locate on the surface; the merchant is thereby spared the need to generate display-specific labels that may require change as products are rearranged. The active nature of the invention allows pricing changes to be immediately dispersed to all displays as soon as the changes are entered into a central computer, with which reader 215 communicates. Such communication can also provide the merchant with inventory information. Removal of products from the display surface 110 is instantly registered by reader 215, and the central computer can be configured to monitor sales activity to prompt (or cause) product replenishment as appropriate.

In a kitchen conext, the tagged objects can be cookware, such as ceramic pots. As the user places a pot on the stove or counter, a spot of light or icon can appear around the pot, thus providing the user with feedback or some additional information. For example, the color of the illuminated spot around the cooking pot can change depending on the temperature of the pot. For input, control buttons in the form of passive, remotely and wirelessly readable electromagnetic sensor tags can be embedded in the handle of the pot, so the user can push these tagged buttons to directly control the temperature of the pot during cooking. In addition to visual feedback provided by the display elements, a series of distributed heating elements can supply output in the form of heat in the vicinity of the pot. Most simply, these heating display elements may be the 2×2 array of elements (burners) commonly used on stove tops.

It will therefore be seen that the foregoing represents a conveniently practiced and versatile approach to sensing of objects within a defined space. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A platform for sensing physical objects having electromagnetically actuable tags associated therewith, the platform comprising:
   a. a sensing surface having a sensing area;
   b. beneath the sensing surface, an array of coils;
   c. control circuitry for (i) causing at least one of the coils to generate a time-varying interrogation signal, the interrogation signal interacting with tags disposed on the surface within the sensing area, (ii) receiving a signal indicative of the interrogation signal as affected by the tags and their proximities to the various coils, and (iii) based on the received signal, determining positions for each of the objects within the sensing area; and
   d. a display generator for creating, visible on the sensing surface, displays relating to the sensed objects derived from the tags associated therewith, the displays remaining co-located with the sensed objects notwithstanding movement thereof on the sensing surface.

2. The platform of claim 1 wherein the control circuitry is further configured to determine, for each of the objects, a height of the object above the surface.

3. The platform of claim 1 wherein the coils include an excitation coil and a series of sensing coils, the excitation coil generating the interrogation signal, the received signal comprising sensing signals received from the sensing coils, the sensing signals representing the interrogation signal as affected by the tags and their proximities to the sensing coils.

4. The platform of claim 3 wherein the coils are affixed to a planar surface, the excitation coil surrounding the sensing coils.

5. The platform of claim 3 wherein the control circuitry is configured to (a) cause continuous generation of the interrogation signal and (b) determine the positions by measuring an average signal strength at a center point of each sensing coil and interpolating between the average signal strengths.

6. The platform of claim 1 wherein the control circuitry is further configured to track the positions of the objects over time.

7. The platform of claim 1 wherein the coils are sequentially caused to generate the interrogation signal, the received signal comprising a field strength sensed by the coil generating the interrogation signal, the sensed field strength being affected by the tags and their proximities to said coil.

8. A platform for sensing physical objects having electromagnetically actuable tags associated therewith, the platform comprising:
   a. a sensing surface having a sensing area;
   b. beneath the sensing surface, a series of coils;
   c. control circuitry for (i) causing at least one of the coils to generate a time-varying interrogation signal, the interrogation signal interacting with tags disposed on the surface within the sensing area, the tags being configured to respond to the interrogation signal based on physical conditions of associated objects, the physical conditions comprising at least one of a weight, a physical manipulation and an environmental condition, (ii) receiving a signal indicative of the interrogation signal as affected by the tags and their proximities to the various coils, and (iii) based on the received signal, determining the physical condition for each of the objects within the sensing area; and
   d. a display generator for creating displays indicating the physical condition for each of the objects, the displays remaining co-located with the objects notwithstanding movement thereof on the sensing surface.

9. The platform of claim 8 wherein each of the coils is part of an LC circuit having a measurable electrical characteristic altered by an external condition, the control circuitry being further configured to sense the characteristic in order to determine the condition.

10. The platform of claim 8 wherein the physical condition is at least one of applied force, temperature, humidity, and light.

11. The platform of claim 10 wherein the electrical characteristic is at least one of resonant frequency, harmonic spectra, and Q factor.

12. A method of sensing physical objects having electromagnetically actuable tags associated therewith, the method comprising the steps of:
   a. providing a sensing surface having a sensing area;
   b. causing generation of at least one time-varying interrogation signal within the sensing area, the at least one interrogation signal interacting with tags disposed on the surface within the sensing area;
   c. receiving a signal indicative of the at least one interrogation signal as affected by the tags;
   d. based on the received signal, determining positions for each of the objects within the sensing area; and
   e. displaying information relevant to the sensed objects and derived from the tags associated therewith, the display remaining visible on the sensing surface and co-located with the sensed objects notwithstanding movement thereof on the sensing surface.

13. The method of claim 12 further comprising the step of determining, for each of the objects, a height of the object above the surface.

14. The method of claim 13 further comprising the step of providing a plurality of coils including an excitation coil and a series of sensing coils, the excitation coil generating an interrogation signal, the received signal comprising sensing signals received from the sensing coils, the sensing signals representing the interrogation signal as affected by the tags and their proximities to the sensing coils.

15. The method of claim 14 wherein the coils are located beneath the surface, the excitation coil surrounding the sensing coils.

16. The method of claim 15 further comprising the steps of (a) causing continuous generation of the excitation signal and (b) determining the positions by measuring an average signal strength at a center point of each sensing coil and interpolating between the average signal strengths.

17. The method of claim 12 further comprising the step of providing a plurality of coils proximate to the sensing area, the coils being sequentially caused to generate the interrogation signal, the received signal comprising a field strength sensed by the coil generating the interrogation signal, the sensed field strength being affected by the tags and their proximities to said coil.

18. The method of claim 12 wherein the display imparts at least one of a visual indication, heat, and sound.

19. A method of sensing physical objects having electromagnetically actuable tags associated therewith, the method comprising the steps of:

a. providing a sensing surface having a sensing area;
b. causing generation of at least one time-varying interrogation signal within the sensing area, the at least one interrogation signal interacting with tags disposed on the surface within the sensing area, the tags being configured to respond to the interrogation signal based on physical conditions of associated objects, wherein the physical conditions comprises at least one of a weight, a physical manipulation and an environmental condition;
c. receiving a signal indicative of the at least one interrogation signal as affected by the tags;
d. based on the received signal, determining the physical condition for each of the objects within the sensing area; and
e. creating displays indicating the physical condition for each of the objects, the displays remaining co-located with the objects notwithstanding movement thereof on the sensing surface.

20. The method of claim 19 wherein each of the coils is part of an LC circuit having a measurable electrical characteristic altered by external condition, and further comprising the step of sensing the characteristic in order to determine the condition.

21. The method of claim 20 wherein the external condition is at least one of applied force, temperature, humidity, and light.

22. The method of claim 20 wherein the electrical characteristic is at least one of resonant frequency, harmonic spectra, and Q factor.

23. The method of claim 19 further comprising the step of providing the objects with mechanical features facilitating manipulation to alter the physical condition.

24. The method of claim 23 wherein the mechanical features comprise at least one of a button, a dial, a slider, and a switch.

25. A method of sensing physical objects having electromagnetically actuable tags associated therewith, the method comprising:
a. providing a sensing surface;
b. forming at least one interrogation signal interacting with an electromagnetically actuable tag disposed proximate to the sensing surface, the tag responding to the at least one interrogation signal based on a physical condition associated with an object that includes the tag;
c. receiving a signal indicative of the at least one interrogation signal as affected by the tag;
d. based on the received signal, determining the physical condition associated with the object; and
e. forming a display visible on the sensing surface and indicative of the physical condition associated with the object, the display remaining co-located with the object notwithstanding movement thereof relative to the sensing surface.

26. The method of claim 25, wherein the physical condition associated with the object comprises at least one of a weight, a physical manipulation, and an environmental condition.

* * * * *